(12) United States Patent
Nakajima

(10) Patent No.: US 11,041,066 B2
(45) Date of Patent: *Jun. 22, 2021

(54) RUBBER COMPOSITION FOR TIRE TREAD

(71) Applicant: The Yokohama Rubber Co., LTD., Tokyo (JP)

(72) Inventor: Miyuki Nakajima, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

This patent is subject to a terminal disclaimer.

(21) Appl. No.: 16/559,432

(22) Filed: Sep. 3, 2019

(65) Prior Publication Data

US 2019/0390043 A1 Dec. 26, 2019

Related U.S. Application Data

(63) Continuation of application No. 15/316,097, filed as application No. PCT/JP2015/066091 on Jun. 3, 2015.

(30) Foreign Application Priority Data

Jun. 4, 2014 (JP) .................................. 2014-115539

(51) Int. Cl.
| | |
|---|---|
| *C08L 9/06* | (2006.01) |
| *B60C 1/00* | (2006.01) |
| *C08K 3/36* | (2006.01) |
| *C08L 7/00* | (2006.01) |
| *C08L 9/00* | (2006.01) |
| *C08L 15/00* | (2006.01) |

(52) U.S. Cl.
CPC .................. *C08L 9/06* (2013.01); *B60C 1/00* (2013.01); *B60C 1/0016* (2013.01); *C08K 3/36* (2013.01); *C08L 7/00* (2013.01); *C08L 9/00* (2013.01); *C08L 15/00* (2013.01); *C08L 2201/08* (2013.01); *C08L 2205/025* (2013.01)

(58) Field of Classification Search
CPC .. C08K 3/36; C08L 19/06; B60C 1/00; B60C 1/0016
See application file for complete search history.

(56) References Cited

U.S. PATENT DOCUMENTS

| | | | |
|---|---|---|---|
| 10,442,917 B2 * | 10/2019 | Nakajima | C08L 9/06 |
| 2009/0000711 A1 * | 1/2009 | Strubel | C08L 9/06 |
| | | | 152/209.1 |
| 2013/0012651 A1 * | 1/2013 | Sasajima | C08L 15/00 |
| | | | 524/575 |
| 2014/0011909 A1 * | 1/2014 | Satou | C08L 9/00 |
| | | | 523/155 |

FOREIGN PATENT DOCUMENTS

| | | | |
|---|---|---|---|
| JP | 2009-091498 | 4/2009 | |
| JP | 2012-121936 | 6/2012 | |
| JP | 2012-188563 | 10/2012 | |
| WO | WO 2011/105362 | 9/2011 | |
| WO | WO-2012073837 A1 * | 6/2012 | ................ C08L 7/00 |

* cited by examiner

*Primary Examiner* — Vickey Nerangis
(74) *Attorney, Agent, or Firm* — Thorpe North & Western

(57) ABSTRACT

A rubber composition for a tire tread is a rubber composition containing from 66 to 110 parts by weight of a filler containing not less than 50 wt. % of a silica per 100 parts by weight of a diene rubber containing not less than 40 wt. % of a terminal-modified styrene-butadiene rubber, from 8 to 35 wt. % of a natural rubber, and from 15 to 40 wt. % of a butadiene rubber; the terminal-modified styrene-butadiene rubber having a terminal functional group derived from a compound reacting with silanol groups; a styrene unit content thereof being from 38 to 48 wt. %; an oil-extended oil content thereof being less than 30 wt. %; a ratio (BR/NR) of a compounded amount of the butadiene rubber (BR) to the natural rubber (NR) being more than 1.0 and not more than 2.5; and an embrittlement temperature of the rubber composition being not more than −45° C.

6 Claims, 1 Drawing Sheet

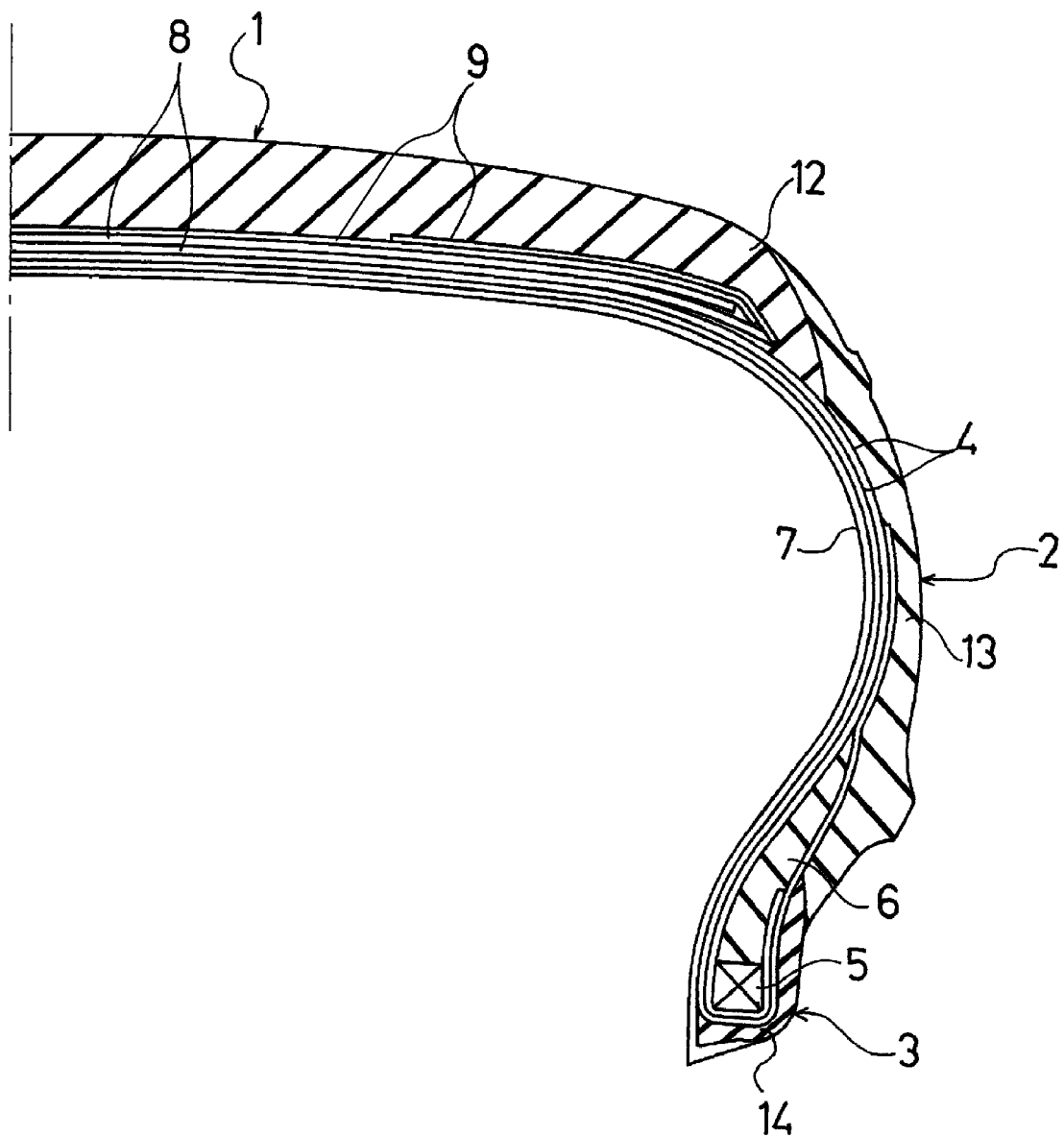

RUBBER COMPOSITION FOR TIRE TREAD

RELATED APPLICATIONS

This application is a continuation of U.S. patent application Ser. No. 15/316,097, filed on Dec. 2, 2016, which is the National Stage of International Patent Application No. PCT/JP2015/066091, filed on Jun. 3, 2015, which claims the benefit of priority from Japan Patent Application No. 2014-115539, filed on Jun. 4, 2014.

TECHNICAL FIELD

The present technology relates to a rubber composition for a tire tread which enhances wet performance, wear resistance, and performance on snow.

BACKGROUND ART

All-season pneumatic tires for passenger vehicles are required to excellent performance on snow when running on a snow-covered road surface as well as wet performance or wear resistance when running on a road surface not covered with snow (wet road surface or dry road surface).

In order to enhance wet performance, silica is typically blended into a rubber composition for a tire. However, in comparison to carbon black, the reinforcement performance when blended into a diene rubber is small, which leads to the problem of reduced wear resistance. In addition, when the compounded amount of silica is increased or the particle size thereof is made fine in order to enhance wet performance, there are problems in that the dispersibility of the silica decreases and the wear resistance is further diminished, or the flexibility of the rubber composition is lost and the performance on snow is diminished.

To resolve this problem, Japanese Unexamined Patent Application Publication No. 2009-91498A and International Patent Application Publication No. WO/2011/105362 propose enhancing the dispersibility of silica with a rubber composition in which silica is compounded in a terminal-modified styrene-butadiene rubber having terminals modified with a polyorganosiloxane or the like. However, the required level anticipated to enhance wet performance and performance on snow is even higher, and there is a demand to further enhance these characteristics.

SUMMARY

The present technology provides a rubber composition for a tire tread which enhances the balance between the performance on snow and the wet performance and wear resistance to or beyond conventional levels.

The rubber composition for a tire tread according to the present technology which achieves the object described above is a rubber composition containing from 66 to 110 parts by weight of a filler containing not less than 50 wt. % of a silica per 100 parts by weight of a diene rubber containing not less than 40 wt. % of a terminal-modified styrene-butadiene rubber, from 8 to 35 wt. % of a natural rubber, and from 15 to 40 wt. % of a butadiene rubber; the terminal-modified styrene-butadiene rubber having a terminal functional group derived from a compound that reacts with silanol groups; a styrene unit content thereof being from 38 to 48 wt. %; an extender oil content thereof being less than 30 wt. %; a ratio (BR/NR) of a compounded amount of the butadiene rubber (BR) to the natural rubber (NR) being larger than 1.0 and not larger than 2.5; and an embrittlement temperature of the rubber composition being not higher than −45° C.

The rubber composition for a tire tread according to the present technology is prepared by compounding from 66 to 110 parts by weight of a filler containing not less than 50 wt. % of a silica into 100 parts by weight of a diene rubber containing: a terminal-modified styrene-butadiene rubber containing a functional group that reacts with silanol groups on the silica surface, the styrene unit content thereof being from 38 to 48 wt. % and the amount of oil extension thereof being less than 30 parts by weight; a natural rubber; and a butadiene rubber. Therefore, it is possible to enhance the wet performance and wear resistance by increasing the affinity between the diene rubber and the silica and enhancing the dispersibility of the silica. Furthermore, since the ratio (BR/NR) of the compounded amounts of the butadiene rubber (BR) and the natural rubber (NR) is larger than 1 and not larger than 2.5 and the embrittlement temperature is set to not higher than −45° C., it is possible to enhance the balance between the performance on snow and the wet performance and wear resistance to or beyond conventional levels.

The silica preferably has a dibutyl phthalate absorption (DBP) of 160 to 220 mL/100 g, a nitrogen adsorption specific surface area of 145 to 193 m$^2$/g, and a cetyl trimethyl ammonium bromide (CTAB) specific surface area of from 140 to 184 m$^2$/g. By compounding such a silica, it is possible to not only further enhance the affinity with the terminal-modified styrene-butadiene rubber, but also to further enhance the performance on snow.

The total amount of the oil component out of 100 wt. % of the rubber composition for a tire tread should be from 25 to 50 wt. %.

The terminal-modified styrene-butadiene rubber is preferably one in which the functional groups of one or both terminals thereof are derived from at least one type of compound selected from the group consisting of polyorganosiloxane compounds, epoxy compounds, and hydrocarbyloxy silicon compounds. In addition, the terminal-modified styrene-butadiene rubber may have an isoprene segment in one of the terminals thereof.

The balance between the performance on snow and the wet performance and wear resistance can be enhanced to or beyond conventional levels with a pneumatic tire in which the rubber composition of the present technology is used in the tread portion.

BRIEF DESCRIPTION OF THE DRAWINGS

FIG. 1 is a partial cross-sectional view in a tire meridian direction illustrating an example of an embodiment of a pneumatic tire in which a rubber composition for a tire tread according to the present technology is used.

DETAILED DESCRIPTION

FIG. 1 illustrates an example of an embodiment of a pneumatic tire in which a rubber composition for a tire tread is used. The pneumatic tire includes a tread portion 1, sidewall portions 2, and bead portions 3.

In FIG. 1, in a pneumatic tire, two layers of a carcass layer 4, formed by arranging reinforcing cords, which extend in a tire radial direction, in a tire circumferential direction at a predetermined pitch and embedding the reinforcing cords in a rubber layer, are disposed extending between the left and right side bead portions 3. Both ends of the carcass layer 4 are made to sandwich a bead filler 6 around a bead core 5 that is embedded in the bead portions 3 and are folded back in a tire axial direction from the inside to the outside. An innerliner layer 7 is disposed inward of the carcass layer 4. Two layers of a belt layer 8, formed by arranging reinforcing cords, which extend inclined in the tire circumferential direction, in the tire axial direction at a predetermined pitch and embedding these reinforcing cords in a rubber layer, are disposed on an outer circumferential side of the carcass layer 4 of the tread portion 1. The reinforcing cords of the two layers of the belt layer 8 intersect interlaminarly so that the directions of inclination with respect to the tire circumferential direction are opposite each other. The belt cover layer 9 is disposed on an outer circumferential side of the belt layer 8. The tread portion 1 is formed from a tread rubber layer 10 on an outer circumferential side of the belt cover layer 9. The tread rubber layer 10 is preferably composed of the rubber composition for a tire tread of the present technology. A side rubber layer 11 is disposed outward of the carcass layer 4 in each side wall portion 2, and a rim cushion rubber layer 12 is provided outward of the portion of the carcass layer 4 that is folded back around each of the bead portions 3. It should be noted that a studless tire is not limited to an embodiment of the pneumatic tire illustrated in FIG. 1 as an example.

In the rubber composition for a tire tread according to the present technology, the rubber component is a diene rubber, and the diene rubber necessarily contains a terminal-modified styrene-butadiene rubber, a natural rubber, and a butadiene rubber. The terminal-modified styrene-butadiene rubber is a styrene-butadiene rubber produced by solution polymerization so as to have functional groups at one or both terminals of the molecular chain. By compounding the terminal-modified styrene-butadiene rubber, the affinity with silica is increased, and the dispersibility is improved. As a result, the effects of the silica are further enhanced and the wear resistance is improved.

In the present technology, the backbone of the modified styrene-butadiene rubber preferably has an isoprene segment at one of the terminals thereof. By configuring one of the terminals of the styrene-butadiene rubber with an isoprene segment, the affinity with silica is enhanced, and the wet performance and wear resistance are further improved.

In addition, the functional group of the modified styrene-butadiene rubber is a functional group derived from a compound that reacts with the silanol groups on the silica surface. The compound that reacts with silanol groups is not particularly limited, but examples thereof include polyorganosiloxane compounds, epoxy compounds, hydrocarbyloxy silicon compounds, tin compounds, silicon compounds, silane compounds, amide compounds and/or imide compounds, isocyanate and/or isothiocyanate compounds, ketone compounds, ester compounds, vinyl compounds, oxysilane compounds, thiirane compounds, oxetane compounds, polysulfide compounds, polysiloxane compounds, polyether compounds, polyene compounds, halogen compounds, and compounds containing fullerenes or the like. Among these, polyorganosiloxane compounds, epoxy compounds, and hydrocarbyloxy silicon compounds are preferable.

In the terminal-modified styrene-butadiene rubber that is used in the present technology, the styrene unit content is from 38 to 48 wt. % and preferably from 40 to 45 wt. %. By setting the styrene unit content of the terminal-modified styrene-butadiene rubber to within such a range, it is possible to increase the rigidity and strength of the rubber composition and to further increase the wear resistance and wet performance when formed into a pneumatic tire. In addition, when a diene rubber other than a butadiene rubber is compounded, the terminal-modified styrene-butadiene rubber takes on a fine phase-separated form from the other diene rubber. As a result, the terminal-modified styrene-butadiene rubber gathers locally in the vicinity of the silica particles, and the terminal modified groups act effectively on the silica, which makes it possible to further enhance affinity and to improve the dispersibility of the silica. If the styrene unit content of the terminal-modified styrene-butadiene rubber is less than 38 wt. %, the effect of forming a fine phase-separated form from the other diene cannot be sufficiently achieved. Additionally, the effects of increasing the rigidity and the strength of the rubber composition cannot be sufficiently obtained. Furthermore, if the styrene unit content of the terminal-modified styrene-butadiene rubber exceeds 48 wt. %, the glass transition temperature (Tg) of the styrene-butadiene rubber increases, and the balance of the viscoelastic characteristics becomes poor. Note that the styrene unit content of the terminal-modified styrene-butadiene rubber is measured by infrared spectroscopy (Hampton method).

In the present technology, the concentration of terminal-modified group in the terminal-modified styrene-butadiene rubber is determined by the relationship to the weight average molecular weight (Mw) of the terminal-modified styrene-butadiene rubber. The weight average molecular weight of the terminal-modified styrene-butadiene rubber is preferably from 600,000 to 1,000,000 and more preferably from 650,000 to 850,000. If the weight average molecular weight of the terminal-modified styrene-butadiene rubber is less than 600,000, the modified group concentration of the terminal-modified styrene-butadiene rubber becomes high and the characteristics of the rubber composition (for example, the silica dispersibility) are better, but since the molecular weight of the polymer itself is low, there is a possibility that the strength and rigidity will be insufficient, and the degree of improvement in the viscoelastic characteristics at high temperatures is small. Furthermore, the wear resistance of the rubber composition may decline. In addition, if the weight average molecular weight of the terminal-modified styrene-butadiene rubber exceeds 1,000,000, the modified group concentration of the terminal-modified styrene-butadiene rubber becomes low, and the affinity with silica becomes insufficient, which leads to the risk that the dispersibility may become poor. Note that the weight average molecular weight (Mw) of the terminal-modified styrene-butadiene rubber is measured by gel permeation chromatography (GPC) on the basis of a polystyrene standard.

In the present technology, the vinyl unit content of the terminal-modified styrene-butadiene rubber is preferably from 20 to 35 wt. % and more preferably from 26 to 34 wt. %. By setting the vinyl unit content of the terminal-modified styrene-butadiene rubber to 20 to 35 wt. %, it is possible to optimize the glass transition temperature (Tg) of the terminal-modified styrene-butadiene rubber. In addition, it is possible to stabilize the fine phase-separated form of the terminal-modified styrene-butadiene rubber formed with respect to the other diene rubber. If the vinyl unit content of the terminal-modified styrene-butadiene rubber is less than 20 wt. %, there is a risk that the Tg of the terminal-modified styrene-butadiene rubber may become low and that the wet grip performance may be diminished. In addition, if the vinyl unit content of the terminal-modified styrene-butadiene rubber exceeds 35 wt. %, there is a possibility that the strength or rigidity may decrease and that the loss tangent (tan δ at 60° C.) may become large. Note that the vinyl unit content of the terminal-modified styrene-butadiene rubber is measured by infrared spectroscopy (Hampton method).

The forming processability of the rubber composition can be enhanced by adding an oil component (oil-extension) to the terminal-modified styrene-butadiene rubber. The amount of oil extension is less than 30 wt. % and preferably not less than 10 wt. % and less than 30 wt. % out of 100 wt. % of the terminal-modified styrene-butadiene rubber. If the amount of oil extension of the terminal-modified styrene-butadiene rubber exceeds 30 parts by weight, the degree of freedom in composition design when compounding oils, softeners, tackifiers, and the like in the rubber composition will become small.

In the present technology, the content of the terminal-modified styrene-butadiene rubber is not less than 40 wt. %, preferably from 40 to 78 wt. %, more preferably from 42 to 70 wt. %, and even more preferably from 45 to 60 wt. % out of 100 wt. % of the diene rubber. If the content of the terminal-modified styrene-butadiene rubber is less than 40 wt. % in the diene rubber, the affinity with the silica will decline, so the dispersibility thereof cannot be enhanced. If the content of the terminal-modified styrene-butadiene rubber exceeds 78 wt. % in the diene rubber, there is a risk that the wear resistance may decline.

Since the rubber composition for a tire tread according to the present technology contains a natural rubber, it is possible to enhance the wear resistance and wet grip performance while maintaining a high level of performance on snow. The compounded amount of the natural rubber is from 8 to 35 wt. % and preferably from 10 to 25 wt. % in 100 wt. % of the diene rubber. If the compounded amount of the natural rubber is less than 8 wt. %, the performance on snow, wet grip performance, and wear resistance cannot be sufficiently enhanced. Additionally, if the compounded amount of the natural rubber exceeds 35 weight %, the wet grip performance will decline. A natural rubber that is regularly used in rubber compositions for a tire is preferably used.

Since the rubber composition for a tire tread according to the present technology contains a butadiene rubber, it is possible to enhance the wear resistance and performance on snow. The compounded amount of the butadiene rubber is from 15 to 40 wt. % and preferably from 25 to 35 wt. % in 100 wt. % of the diene rubber. If the compounded amount of the butadiene rubber is less than 8 wt. %, the wear resistance will decline. Additionally, if the compounded amount of the butadiene rubber exceeds 40 wt. %, there is a concern that tipping resistance may be diminished. Any butadiene rubber that is regularly used in rubber compositions for a tire may be used.

In the present technology, the compounded amount ratio (BR/NR) of the compounded amount of the butadiene rubber (BR) to the compounded amount of the natural rubber (NR) is larger than 1.0 and not larger than 2.5 and preferably from 1.5 to 2.3. If the ratio (BR/NR) of the compounded amounts of the butadiene rubber and the natural rubber is not larger than 1.0, it is not possible to enhance the balance between the performance on snow and the wet performance and wear resistance, and it is not possible to enhance the performance on snow, in particular. In addition, if the ratio (BR/NR) of the compounded amounts exceeds 2.5, the wet grip performance will decline.

In the present technology, diene rubbers other than a terminal-modified styrene-butadiene rubber, a natural rubber, and a butadiene rubber may be compounded as diene rubbers within a range that does not diminish the purpose of the present technology. Examples of other diene rubbers include isoprene rubber, unmodified styrenebutadiene rubber, butyl rubber, and halogenated butyl rubber. A single rubber may be used or multiple rubbers may be blended and used as the diene rubber.

The rubber composition for a tire tread according to the present technology contains from 66 to 110 parts by weight of a filler containing not less than 50 wt. % of a silica per 100 parts by weight of the diene rubber. By setting the compounded amount of the filler to within such a range, it is possible to balance the wet grip performance and the wear resistance of the rubber composition at a higher level. If the compounded amount of the filler is less than 66 parts by weight, a high level of wet grip performance cannot be secured. If the compounded amount of the filler exceeds 110 parts by weight the wear resistance will be diminished.

The content of the silica in 100 wt. % of the filler is not less than 50 wt. % and preferably from 70 to 100 wt. %. By setting the content of the silica in the filler to within such a range, it is possible to achieve both the wet grip performance and the wear resistance of the rubber composition. In addition, by compounding the terminal-modified styrene-butadiene rubber, the affinity with the silica is increased and the dispersibility is enhanced, which makes it possible to further enhance the effect of compounding silica.

The silica may be any silica that is regularly used in rubber compositions for a tire tread. Examples thereof include wet method silica, dry method silica, surface treated silica, and the like. Additionally, the particle characteristics of the silica are not particularly limited but preferably satisfy all three of the particle characteristics below.

(1) DBP Absorption Number: From 160 to 220 mL/100 g

The DBP absorption number of the silica is preferably set to be from 160 to 220 mL/100 g. If the DBP absorption number is less than 160 mL/100 g, breaking strength will decline. If the DBP absorption number exceeds 220 mL/100 g, viscosity will excessively increase and mixing processability will be negatively affected. The DBP absorption number of the silica is calculated in accordance with Oil Absorption Number Method A described in JIS (Japanese Industrial Standard) K6217-4.

(2) Nitrogen Specific Surface Area ($N_2SA$): From 145 to 193 $m^2/g$

The nitrogen specific surface area ($N_2SA$) of the silica is preferably set to be from 145 to 193 $m^2/g$. It is not preferable for the $N_2SA$ of the silica to be less than 145 $m^2/g$ because the wet grip performance will be diminished. If the $N_2SA$ of the silica exceeds 193 $m^2/g$, the dispersibility of the silica will decline, and the wear resistance will be diminished. In addition, the rubber composition will become hard, and the performance on snow will decline, which is not preferable. The $N_2SA$ of the silica is calculated in accordance with JIS K6217-2.

(3) CTAB Specific Surface Area (CTAB): From 140 to 184 $m^2/g$

The CTAB specific surface area (CTAB) of the silica is preferably set to be from 140 to 184 $m^2/g$. It is not preferable for the CTAB of the silica to be less than 140 $m^2/g$ because the wet grip performance will be diminished. It is also not preferable for the CTAB of the silica to exceed 184 $m^2/g$ because the dispersibility of the silica will decline and the wear resistance will be diminished. The CTAB of the silica is calculated in accordance with JIS K6217-3.

The dispersibility of the silica can be enhanced by compounding a silica satisfying all of the particle characteristics of (1) to (3) described above together with the terminal-modified styrene-butadiene rubber described above. Therefore, the terminal-modified styrene-butadiene rubber and the silica having the particle characteristics described above both act to modify the tan δ of the rubber composition, which makes it possible to achieve even greater synergy. In addition, the wear resistance and performance on snow of the rubber composition can be made excellent by compounding both a natural rubber and a butadiene rubber into the terminal-modified styrene-butadiene rubber.

In the present technology, a silica satisfying all of the particle characteristics of (1) to (3) may be used alone as a silica. Alternatively, this silica may also be used together with another silica that does not satisfy the particle characteristics of (1) to (3).

The silica to be used may be appropriately selected from commercially available products. Additionally, a silica obtained through a regular manufacturing method may be used.

In the rubber composition of the present technology, a silane coupling agent is preferably compounded together with the silica as such will lead to an improvement in the dispersibility of the silica and a further increase in the reinforcement action of the diene rubber. The blending quantity of the silane coupling agent is preferably from 3 to 20 wt. %, and more preferably from 5 to 15 wt. %, of the blending quantity of the silica. If the compounded amount of the silane coupling agent is less than 3 wt. % of the weight of the silica, the effect of improving the dispersibility of the silica cannot be sufficiently obtained. Furthermore, when the compounded amount of the silane coupling agent exceeds 20 wt. %, the silane coupling agents condense with each other, and the desired effects cannot be obtained.

The silane coupling agent is not particularly limited, but is preferably a sulfur-containing silane coupling agent. Examples thereof include bis-(3-triethoxysilylpropyl)tetrasulfide, bis(3-triethoxysilylpropyl)disulfide, 3-trimethoxysilylpropyl benzothiazole tetrasulfide, γ-mercaptopropyltriethoxysilane, and 3-octanoylthiopropyl triethoxysilane.

The rubber composition for a tire tread of the present technology may also include fillers other than the silica. Examples of such fillers other than the silica include, carbon black, clay, mica, talc, calcium carbonate, aluminum hydroxide, aluminum oxide, and titanium oxide. Among these, carbon black is preferable. This is because rubber strength can be increased by compounding other fillers, including carbon black. A content of the other fillers is not greater than 50 wt. % and is preferably from 0% to 30 wt. % of 100 wt. % of the filler. If the content of the other fillers exceeds 50 wt. %, the rolling resistance will worsen.

The embrittlement temperature of the rubber composition for a tire tread according to the present technology is not higher than −45° C., and is preferably from −60° C. to −50° C. If the embrittlement temperature of the rubber composition is higher than −45° C., the performance on snow will be diminished. The embrittlement temperature of the rubber composition for a tire tread is the 50% impact embrittlement temperature determined in accordance with JIS K6261.

The total amount of the oil components in the rubber composition for a tire tread should be from 25 to 50 wt. % and more preferably from 30 to 45 wt. % out of 100 wt. % of the rubber composition. If the total amount of the oil components is less than 25 wt. %, there is a risk that it may not be possible to sufficiently enhance the performance on snow. In addition, if the total amount of the oil components exceeds 50 wt. %, there is a risk that it may not be possible to sufficiently enhance the wear resistance. Note that the total amount of the oil components refers to the oil components contained in the rubber composition composed of oil components such as an extender oil in the diene rubber as well as a natural oil, a synthetic oil, a plasticizer, and the like added in a case of the preparation of the rubber composition.

The rubber composition for a tire tread may also contain various compounding agents that are commonly used in rubber compositions for a tire tread. Examples thereof include vulcanization or cross-linking agents, vulcanization accelerators, antiaging agents, plasticizers, processing aids, liquid polymers, terpene resins, and thermosetting resins. These compounding agents can be kneaded by a common method to obtain a rubber composition that can then be used for vulcanization or cross-linking. These compounding agents can be compounded in typical amounts conventionally used so long as the objects of the present technology are not hindered. The rubber composition for a tire tread can be produced by mixing the above-mentioned components using a well-known rubber kneading machine such as a Banbury mixer, a kneader, a roller, or the like.

The rubber composition for a tire tread of the present technology can be advantageously used in pneumatic tires. The balance between the performance on snow when running on a snow-covered road surface and the wet performance or wear resistance when running on a road surface not covered with snow can be enhanced to or beyond conventional levels with a pneumatic tire in which this rubber composition is used in a tire tread portion and, in particular, an all-season pneumatic tire for a passenger vehicle.

The present technology is further described below using examples.

However, the scope of the present technology is not limited to these examples.

EXAMPLES

Fifteen types of rubber compositions for a tire tread (Working Examples 1 to 7 and Comparative Examples 1 to 8) were prepared according to the formulations shown in Tables 1 and 2 with the compounding agents shown in Table 3 used as common components. With the exception of the sulfur and the vulcanization accelerators, the components were measured and kneaded in a 1.8 L sealed mixer for 5 minutes, and the master batch was this discharged and cooled at room temperature. The master batch was fed to a 1.8 L kneader, and the sulfur and the vulcanization accelerator were added to the kneader and mixed to obtain a rubber composition for a tire tread. Note that it Tables 1 and 2, the modified S-SBR 1 and 2 are oil extended products, so the net rubber amounts are also included in parentheses. In addition, the compounded amounts of the common components in Table 3 are listed as the parts by weight per 100 parts by weight of the diene rubber shown in Tables 1 and 2.

Pneumatic tires of a size used in cap treads (225/60R18) were vulcanization-molded using the 15 types of rubber compositions that were obtained. The wear resistance, performance on snow, and wet performance were evaluated by the methods described below using each of the pneumatic tires.

Wear Resistance

The obtained pneumatic tires were assembled on wheels with a rim size of 18×7 JJ, filled to an air pressure of 220 kPa, and mounted on a 2.5 L class test vehicle (made in Japan). The vehicle was driven ten laps at a speed of 80 km/h over a dry road surface of a test course 5 km in length per lap. The state of wear on the tread surface was then observed visually and evaluated with a score using Comparative Example 1 as 100. The results were recorded in Tables 1 and 2. Larger evaluation values, particularly index values of 102 or greater, indicate superior wear resistance.

Performance on Snow

The obtained pneumatic tires were assembled on wheels having a rim size of 18×7JJ and mounted on a 2.5 L class test vehicle (made in Japan). The vehicle was driven on a test course of 2.6 km per lap in a snow-covered state under conditions with an air pressure of 200 kPa, and the steering stability at that time was scored based on sensory evaluation of three experienced evaluators. The obtained results were indexed and recorded in Tables 1 to 2, with the index value of Comparative Example 1 being 100. Larger index values, particularly index values of 102 and above, indicate superior performance on snow (steering stability) on snow-covered road surfaces.

Wet Performance

The obtained pneumatic tires were assembled on wheels having a rim size of 18×7JJ and mounted on a 2.5 L class test vehicle (made in Japan). The vehicle was driven on a test course of 2.6 km per lap with a wet road surface under conditions with an air pressure of 220 kPa, and the steering stability at that time was scored based on sensory evaluation of three experienced evaluators. The obtained results were indexed and recorded in Tables 1 to 2, with the index value of Comparative Example 1 being 100. Larger index values, particularly index values of 102 and above, indicate superior wet steering stability on wet road surfaces.

TABLE 1-1

|  |  | Comparative Example 1 | Comparative Example 2 | Comparative Example 3 | Comparative Example 4 |
|---|---|---|---|---|---|
| Modified S-SBR 1 | Part by weight | 61.87 (45) | 61.87 (45) | 103.12 (75) | 38.50 (28) |
| BR | Part by weight | 25 | 40 | 15 | 40 |
| NR | Part by weight | 30 | 15 | 10 | 32 |
| Silica 1 | Part by weight | 60 | 60 | 60 | 60 |
| Carbon black | Part by weight | 20 | 20 | 20 | 20 |
| Coupling agent | Part by weight | 4.0 | 4.0 | 4.0 | 4.0 |
| Oil | Part by weight | 20 | 20 | 0 | 26.5 |
| Weight ratio (BR/NR) | — | — | 0.83 | 2.67 | 1.50 | 1.25 |
| Silica ratio | wt. % | 75 | 75 | 75 | 75 |
| Total filler | (Part by weight) | 80 | 80 | 80 | 80 |
| Total oil components | (Part by weight) | 36.9 | 36.9 | 28.1 | 37.0 |
| Embrittlement temperature | ° C. | −40 | −53 | −38 | −58 |
| Wear resistance | Index value | 100 | 120 | 95 | 122 |
| Performance on snow | Index value | 100 | 108 | 90 | 112 |
| Wet performance | Index value | 100 | 95 | 108 | 90 |

TABLE 1-2

|  |  | Comparative Example 5 | Comparative Example 6 | Comparative Example 7 | Comparative Example 8 |
|---|---|---|---|---|---|
| Modified S-SBR 1 | Part by weight | 56.65 (41.2) | 61.87 (45) | 61.87 (45) | 61.87 (45) |
| BR | Part by weight | 42 | 35 | 35 | 35 |
| NR | Part by weight | 16.8 | 20 | 20 | 20 |
| Silica 1 | Part by weight | 60 | 35 | 45 | 80 |
| Carbon black | Part by weight | 20 | 45 | 20 | 35 |
| Coupling agent | Part by weight | 4.0 | 2.5 | 3.2 | 4.0 |
| Oil | Part by weight | 22 | 20 | 20 | 20 |
| Weight ratio (BR/NR) | — | 2.50 | 1.75 | 1.75 | 1.75 |
| Silica ratio | wt. % | 75 | 44 | 69 | 70 |
| Total filler | (Part by weight) | 80 | 80 | 65 | 115 |
| Total oil components | (Part by weight) | 37.0 | 36.9 | 36.9 | 36.9 |
| Embrittlement temperature | ° C. | −55 | −47 | −48 | −47 |
| Wear resistance | Index value | 125 | 118 | 121 | 99 |
| Performance on snow | Index value | 110 | 109 | 111 | 96 |
| Wet performance | Index value | 93 | 92 | 94 | 110 |

TABLE 2-1

|  |  | Working Example 1 | Working Example 2 | Working Example 3 | Working Example 4 |
|---|---|---|---|---|---|
| Modified S-SBR 1 | Part by weight | 61.87 (45) | 61.87 (45) | 61.87 (45) | 61.87 (45) |
| Modified S-SBR 2 | Part by weight |  |  |  |  |
| BR | Part by weight | 35 | 35 | 35 | 35 |
| NR | Part by weight | 20 | 20 | 20 | 20 |
| Silica 1 | Part by weight | 60 | 60 |  | 60 |
| Silica 2 | Part by weight |  |  | 60 |  |
| Carbon black | Part by weight | 20 | 20 | 20 | 20 |
| Coupling agent | Part by weight | 4.0 | 4.0 | 4.0 | 4.0 |
| Oil | Part by weight | 5 | 35 | 20 | 20 |
| Weight ratio (BR/NR) | — | 1.75 | 1.75 | 1.75 | 1.75 |

TABLE 2-1-continued

|  |  | Working Example 1 | Working Example 2 | Working Example 3 | Working Example 4 |
|---|---|---|---|---|---|
| Silica proportion | wt. % | 75 | 75 | 0 | 75 |
| Total filler | (Part by weight) | 80 | 80 | 80 | 80 |
| Total oil components | (Part by weight) | 21.9 | 51.9 | 36.9 | 36.9 |
| Embrittlement temperature | ° C. | −48 | −51 | −50 | −50 |
| Wear resistance | Index value | 110 | 102 | 102 | 105 |
| Performance on snow | Index value | 101 | 120 | 105 | 115 |
| Wet performance | Index value | 105 | 103 | 104 | 104 |

TABLE 2-2

|  |  | Working Example 5 | Working Example 6 | Working Example 7 |
|---|---|---|---|---|
| Modified S-SBR 1 | Part by weight | 68.75 (50) | 89.37 (65) |  |
| Modified S-SBR 2 | Part by weight |  |  | 61.87 (45) |
| BR | Part by weight | 35 | 20 | 35 |
| NR | Part by weight | 15 | 15 | 20 |
| Silica 1 | Part by weight | 60 | 60 | 60 |
| Silica 2 | Part by weight |  |  |  |
| Carbon black | Part by weight | 20 | 20 | 20 |
| Coupling agent | Part by weight | 4.0 | 4.0 | 4.0 |
| Oil | Part by weight | 18.2 | 12.6 | 20 |
| Weight ratio (BR/NR) | — | 2.33 | 1.33 | 1.75 |
| Silica proportion | wt. % | 75 | 75 | 75 |
| Total filler | (Part by weight) | 80 | 80 | 80 |
| Total oil components | (Part by weight) | 37.0 | 37.0 | 36.9 |
| Embrittlement temperature | ° C. | −47 | −45 | −53 |
| Wear resistance | Index value | 102 | 101 | 105 |
| Performance on snow | Index value | 113 | 103 | 117 |
| Wet performance | Index value | 106 | 107 | 103 |

The types of raw materials used as indicated in Tables 1 to 2 are described below.

Modified S-SBR 1: Terminal-modified solution polymerization styrene-butadiene rubber prepared according to the production method described below; terminal-modified solution-polymerized styrene-butadiene rubber; styrene unit content of 42 wt. %; vinyl unit content of 32 wt. %; weight average molecular weight (Mw) of 750,000; Tg of −25° C.; extender oil content of 27.27 wt. %.

Modified S-SBR 2: Terminal-modified solution-polymerized styrene-butadiene rubber prepared according to the production method described below; terminal-modified styrene-butadiene rubber; styrene unit content of 21 wt. %; vinyl unit content of 63 wt. %; weight average molecular weight (Mw) of 440,000; Tg of −27° C.; extender oil content of 27.27 wt. %.

BR: Butadiene rubber; Nipol BR1220, manufactured by Zeon Corporation

NR: natural rubber; SIR20

Silica 1: Zeosil 1165MP, manufactured by Rhodia; DBP absorption number of 200 mL/100 g; nitrogen specific surface area ($N_2SA$) of 160 $m^2/g$; CTAB specific surface area (CTAB) of 159 $m^2/g$.

Silica 2: Zeosil Premium 200 MP, manufactured by Rhodia; DBP absorption number of 203 mL/100 g; nitrogen specific surface area ($N_2SA$) of 200 $m^2/g$; CTAB specific surface area (CTAB) of 197 $m^2/g$.

Carbon black: SEAST KH, manufactured by Tokai Carbon Co., Ltd.

Silane coupling agent: Bis(3-triethoxysilylpropyl)tetrasulfide; Si69, manufactured by Evonik-Degussa Oil: Extract No. 4S, manufactured by Showa Shell Sekiyu K.K.

Production Method of Modified S-SBR 1

To a nitrogen-purged autoclave reaction vessel having an internal capacity of 10, 4533 g of cyclohexane, 338.9 g (3.254 mol) of styrene, 468.0 g (8.652 mol) of butadiene, 20.0 g (0.294 mol) of isoprene, and 0.189 mL (1.271 mmol) of N,N,N',N'-tetramethylethylenediamine were added L. Then, agitation was begun. After the temperature of the content in the reaction vessel was adjusted to 50° C., 5.061 mL (7.945 mmol) of n-butyllithium was added. After the polymerization conversion rate reached approximately 100%, 12.0 g of isoprene was added and the mixture was reacted for 5 minutes. Then, 0.281 g (0.318 mmol) of a toluene solution containing 40 wt. % of 1,6-bis(trichlorosilyl)hexane was added and the mixture was reacted for 30 minutes. Furthermore, 18.3 g (0.318 mmol) of a xylene solution containing 40 wt. % of polyorganosiloxane A described below was added and the mixture was reacted for 30 minutes. Then, 0.5 mL of methanol was added and the mixture was agitated for 30 minutes. A small amount of antiaging agent (IRGANOX 1520, manufactured by BASF) was added to the resulting polymer solution, and after Fukko Luella Ceramic 30 (manufactured by Nippon Oil Corporation) was added so that the extender oil content was 27.27 wt. %, the solid rubber was recovered by a steam stripping method. The obtained solid rubber was dehydrated using a roll and dried in a dryer. Thus, the modified S-SBR 1 was obtained.

Polyorganosiloxane A: Polyorganosiloxane having the structure of general formula (1): where m=80, k=120, $X_1$, $X_4$, $R_1$ to $R_3$, and $R_5$ to $R_8$ are each methyl groups (—$CH_3$), and $X_2$ is a hydrocarbon group expressed by general formula (2) below.

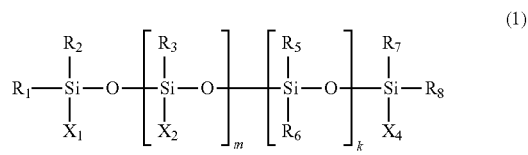

(1)

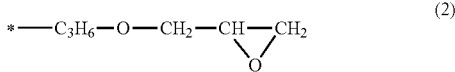

Production Method of Modified S-SBR 2

To a nitrogen-purged 100 mL ampoule bottle, 28 g of cyclohexane and 8.6 mmol of tetramethylethylenediamine were added, and then 6.1 mmol of n-butyllithium was further added. Then, 8.0 g of isoprene was slowly added, and the mixture was reacted for 120 minutes in the 60° C. ampoule bottle to yield isoprene block (used as initiator 1). This initiator 1 had a weight average molecular weight (Mw) of 2,200, a molecular weight distribution (Mw/Mn) of 1.08, and an isoprene unit-derived vinyl bond content of 72.3 wt. %.

Then, in a nitrogen atmosphere in an autoclave equipped with a stirrer, 4,000 g of cyclohexane, 357.7 g of 1,3-butadiene, and 132.3 g of styrene were loaded, and then the entire amount of initiator 1 was added, and polymerization of the mixture was initiated at 40° C. Ten minutes after polymerization was initiated, 195.3 g of 1,3-butadiene and 14.7 g of styrene were continuously added over the course of 60 minutes. The maximum temperature during the polymerization reaction was 60° C. After continuous addition was completed, the polymerization reaction was continued for another 20 minutes, and after it was confirmed that the polymer conversion rate had reached from 95 to 100%, 0.08 mmol of 1,6-bis(trichlorosilyl)hexane was added in the state of a cyclohexane solution having a 20 mass % concentration, and the mixture was reacted for 10 minutes. Furthermore, 0.027 mmol of the polyorganosiloxane A represented by Formula (1) below was added in the state of a xylene solution having a 20 mass % concentration, and the mixture was reacted for 30 minutes. Next, methanol was added as a polymerization quencher in an amount equivalent to twice the number of moles of n-butyllithium used, and a solution containing modified S-SBR 2 was obtained. After Irganox 1520L (manufactured by Ciba Specialty Chemicals Corp.) was added to this solution as an anti-aging agent in an amount of 0.15 parts by mass per 100 parts by mass of the modified S-SBR 2, Fukko Luella Ceramic 30 (manufactured by Nippon Oil Corporation) was added so that the extender oil content was 27.27 wt. %. The solvent was removed by steam stripping, after the resulting substance was vacuum-dried for 24 hours at 60° C., a solid rubber was recovered. The obtained solid rubber was dehydrated using a roll and dried in a dryer. Thus, the modified S-SBR 2 was obtained.

TABLE 3

Formulation of common compounding agents

| | |
|---|---|
| Zinc oxide | 3.0 Parts by weight |
| Stearic acid | 2.0 Parts by weight |
| Anti-aging agent | 2.0 Parts by weight |
| Wax | 2.0 Parts by weight |
| Sulfur | 2.0 Parts by weight |
| Vulcanization accelerator 1 | 2.0 Parts by weight |
| Vulcanization accelerator 2 | 1.5 Parts by weight |

The types of raw materials used as in Table 3 are described below.

Zinc oxide: type III Zinc Oxide, manufactured by Seido Chemical Industry Co., Ltd.

Stearic acid: beads stearic acid, manufactured by Chiba Fatty Acid

Anti-aging agent: Antigen 6C, manufactured by Sumitomo Chemical Co., Ltd.

Wax: SANNOC, manufactured by Ouchi Shinko Chemical Industrial

Sulfur: Golden Flower oil treated sulfur powder, manufactured by Tsurumi Chemical Industry Co., Ltd.

Vulcanization accelerator 1: Vulcanization accelerator CBS; Nocceler CZ-G, manufactured by Ouchi Shinko Chemical Industrial Co., Ltd.

Vulcanization Accelerator 2: Vulcanization accelerator DPG; Nocceler D, manufactured by Ouchi Shinko Chemical Industrial Co., Ltd.

As is clear from Table 2, the balance between the performance on snow and the wet performance and wear resistance can be enhanced to or beyond conventional levels with the rubber compositions for a tire tread of Working Examples 1 to 8.

The rubber composition of Comparative Example 1 has a weight ratio (BR/NR) of not greater than 1, and this is used as a reference.

The weight ratio (BR/NR) of the rubber composition of Comparative Example 2 exceeds 2.5, so the wet performance is diminished.

The rubber composition of Comparative Example 3 has an embrittlement temperature higher than −45° C., so the performance on snow and wear resistance are diminished.

The rubber composition of Comparative Example 4 has a modified S-SBR 1 content of less than 40 wt. %, so the wet performance is diminished.

The rubber composition of Comparative Example 5 has a compounded amount of butadiene rubber exceeding 40 wt. %, so the wet performance is diminished.

The rubber composition of Comparative Example 6 has a silica weight ratio of less than 50 wt. % in the filler, so the wet performance is diminished.

The rubber composition of Comparative Example 7 has a filler compounded amount of less than 66 parts by weight, so the wet performance is diminished.

The rubber composition of Comparative Example 8 has a filler compounded amount exceeding 110 parts by weight, so the performance on snow is diminished.

The invention claimed is:

1. A rubber composition for a tire tread, the composition comprising from 66 to 110 parts by weight of a filler containing not less than 50 wt. % of a silica per 100 parts by weight of a diene rubber containing from 40 to less than 60 wt. % of a terminal-modified styrene-butadiene rubber, from 8 to 35 wt. % of a natural rubber, and from 15 to 40 wt. % of a butadiene rubber; the terminal-modified styrene-butadiene rubber having a terminal functional group derived from a compound reacting with silanol groups; a styrene unit content thereof being from 38 to 48 wt. %; an extender oil content thereof being less than 30 wt. %; a ratio (BR/NR) of a compounded amount of the butadiene rubber (BR) to the natural rubber (NR) being within a range of from 1.33 to 2.5; and an embrittlement temperature of the rubber composition being not higher than −45° C.;

wherein the functional group of at least one terminal of the terminal-modified styrene-butadiene rubber is derived from at least one type of compound selected from the group consisting of polyorganosiloxane compounds and hydrocarbyloxy silicon compounds.

2. The rubber composition for a tire tread according to claim 1, wherein a total of oil components is from 25 to 50 wt. % out of 100 wt. % of the rubber composition for a tire tread.

3. The rubber composition for a tire tread according to claim 1, wherein the composition has an isoprene segment on at least one terminal of the terminal-modified styrene-butadiene rubber.

4. The rubber composition for a tire tread according to claim 1, comprising from 82 to 110 parts by weight of the filler.

5. The rubber composition for a tire tread according to claim 1, comprising from 40 to 59 wt. % of the terminal-modified styrene-butadiene rubber.

6. A pneumatic wherein the rubber composition for a tire tread described in claim 1 is used.

* * * * *